US012646072B2

(12) United States Patent
Banga et al.

(10) Patent No.: US 12,646,072 B2
(45) Date of Patent: *Jun. 2, 2026

(54) SYSTEMS AND METHODS OF VERIFYING ORIGIN OF REQUEST FOR PAYMENT

(71) Applicant: JPMORGAN CHASE BANK, N.A., New York, NY (US)

(72) Inventors: Jasbir Banga, Swedesboro, NJ (US); Reetu Raj Bok, Philadelphia, PA (US); Howard Spector, Woolwich, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 23 days.

This patent is subject to a terminal disclaimer.

(21) Appl. No.: 18/959,155

(22) Filed: Nov. 25, 2024

(65) Prior Publication Data

US 2025/0094991 A1 Mar. 20, 2025

Related U.S. Application Data

(63) Continuation of application No. 17/463,220, filed on Aug. 31, 2021, now Pat. No. 12,182,817.

(51) Int. Cl.
*G06Q 20/32* (2012.01)
*G06F 9/451* (2018.01)
(Continued)

(52) U.S. Cl.
CPC ..... *G06Q 20/4016* (2013.01); *G06Q 20/3255* (2013.01); *G06Q 20/3267* (2020.05)

(58) Field of Classification Search
CPC .......... G06Q 20/4016; G06Q 20/3255; G06Q 20/3267
See application file for complete search history.

(56) References Cited

U.S. PATENT DOCUMENTS

2007/0264982 A1* 11/2007 Nguyen ............. H04N 21/4826
                                                                    455/414.1
2010/0125895 A1* 5/2010 Shull ...................... H04L 63/08
                                                                    726/4

(Continued)

OTHER PUBLICATIONS

R. Yackel, "How many types of digital certificates are there?" Dec. 10, 2020, KeyFactor blog, retrieved from: https://www.keyfactor.com/blog/types-of-digital-certificates/ (Year: 2020).*

(Continued)

*Primary Examiner* — Jessica Lemieux
*Assistant Examiner* — Douglas W Pinsky
(74) *Attorney, Agent, or Firm* — GREENBERG TRAURIG LLP

(57) ABSTRACT

A method for verifying origin of request for payments may include a financial institution computer program: receiving a request for a payment URL from a merchant, the payment URL provided for a transaction with a customer; generating the payment URL, wherein the payment URL comprises a pointer to a network location for the financial institution; providing the payment URL to a customer electronic device; receiving, from the customer electronic device and at a browsed URL, a stored or pinned certificate of domain for the payment URL; (5) comparing the stored or pinned certificate of domain for the payment URL to a certificate of domain for the browsed URL; presenting a payment page in response to a match; and returning an error in response to a mismatch.

12 Claims, 6 Drawing Sheets

(51) Int. Cl.

| | |
|---|---|
| *G06F 16/23* | (2019.01) |
| *G06F 21/53* | (2013.01) |
| *G06Q 20/10* | (2012.01) |
| *G06Q 20/36* | (2012.01) |
| *G06Q 20/38* | (2012.01) |
| *G06Q 20/40* | (2012.01) |
| *G06Q 40/06* | (2012.01) |
| *H04L 29/06* | (2006.01) |
| *H04W 12/06* | (2021.01) |
| *H04W 12/08* | (2021.01) |
| *G06F 21/31* | (2013.01) |
| *G06F 21/32* | (2013.01) |
| *G06F 21/45* | (2013.01) |
| *G06F 21/57* | (2013.01) |
| *G06Q 20/34* | (2012.01) |
| *G06Q 40/02* | (2023.01) |
| *H04W 4/14* | (2009.01) |
| *H04W 12/062* | (2021.01) |
| *H04W 12/72* | (2021.01) |
| *H04W 60/00* | (2009.01) |

(56) References Cited

U.S. PATENT DOCUMENTS

| | | | | |
|---|---|---|---|---|
| 2012/0185382 A1* | 7/2012 | Fischer | | G06Q 30/04 |
| | | | | 705/40 |
| 2015/0134540 A1* | 5/2015 | Law | | G06Q 20/409 |
| | | | | 705/72 |
| 2016/0063466 A1* | 3/2016 | Sheridan | | G06Q 20/1235 |
| | | | | 705/26.25 |
| 2017/0193475 A1* | 7/2017 | Mercille | | G06Q 20/3274 |
| 2017/0256007 A1* | 9/2017 | Barman | | G06Q 20/14 |
| 2019/0156167 A1* | 5/2019 | Singh | | G06K 19/06037 |
| 2021/0383400 A1* | 12/2021 | Mimassi | | G06Q 20/327 |
| 2022/0335432 A1* | 10/2022 | Rule | | G06Q 20/3226 |
| 2022/0383291 A1* | 12/2022 | Flanagan | | G06Q 20/40 |

OTHER PUBLICATIONS

Yackel, Ryan, "How many types of digital certificates are there?" Dec. 10, 2020, KeyFactor blog.

* cited by examiner

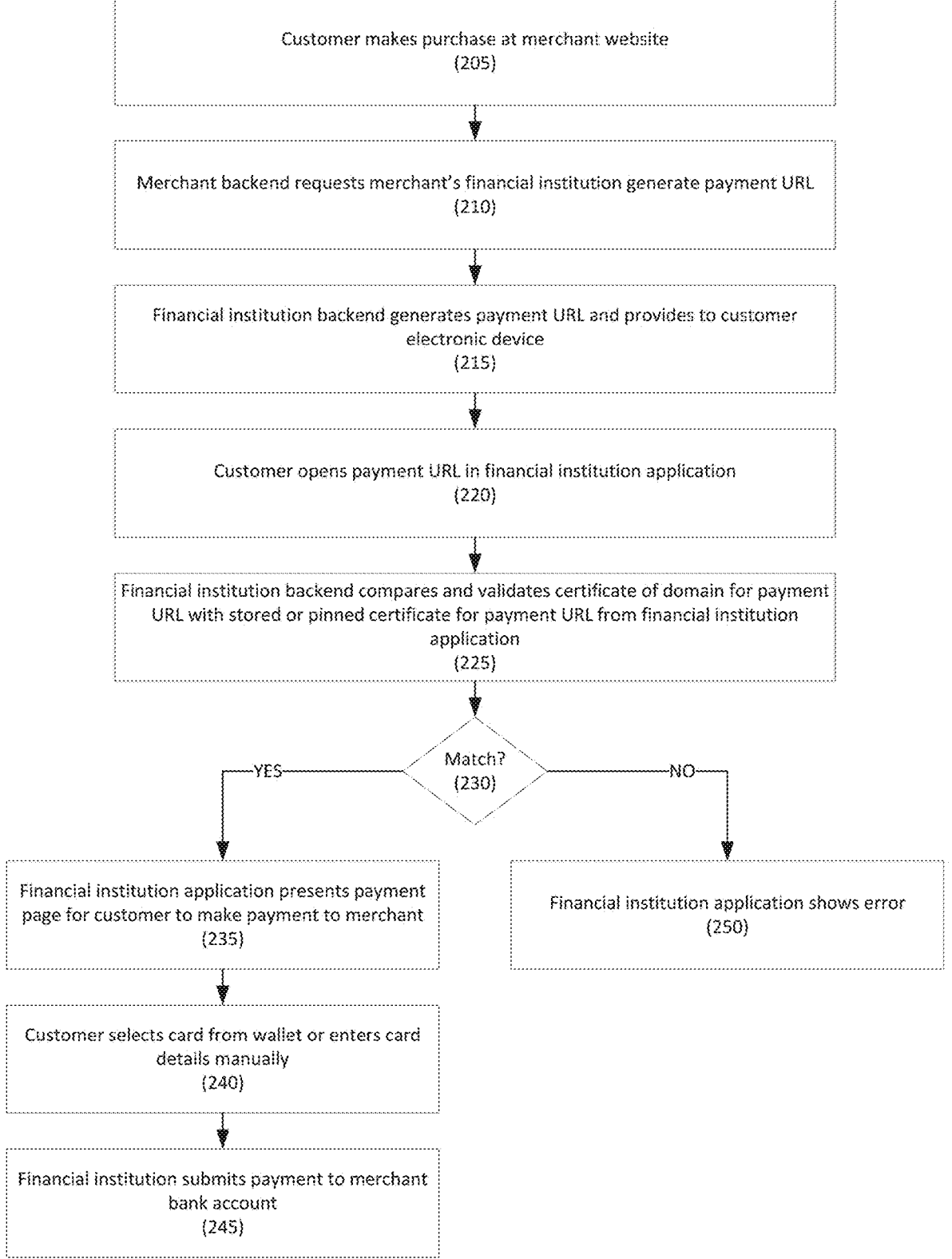

Customer makes purchase at merchant website
(205)

Merchant backend requests merchant's financial institution generate payment URL
(210)

Financial institution backend generates payment URL and provides to customer electronic device
(215)

Customer opens payment URL in financial institution application
(220)

Financial institution backend compares and validates certificate of domain for payment URL with stored or pinned certificate for payment URL from financial institution application
(225)

Match?
(230)

YES

NO

Financial institution application presents payment page for customer to make payment to merchant
(235)

Financial institution application shows error
(250)

Customer selects card from wallet or enters card details manually
(240)

Financial institution submits payment to merchant bank account
(245)

FIGURE 2

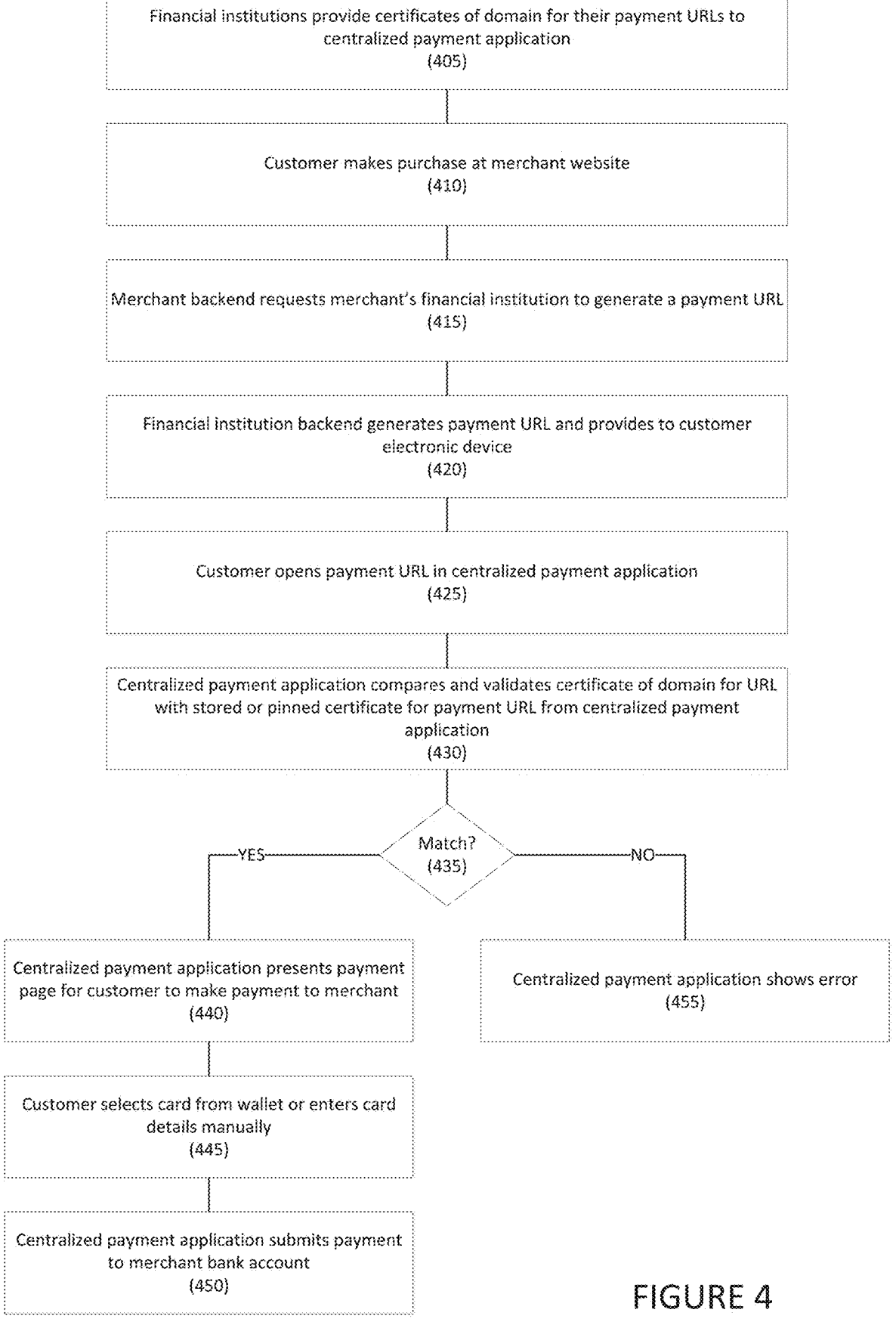

Financial institutions provide certificates of domain for their payment URLs to centralized payment application
(405)

Customer makes purchase at merchant website
(410)

Merchant backend requests merchant's financial institution to generate a payment URL
(415)

Financial institution backend generates payment URL and provides to customer electronic device
(420)

Customer opens payment URL in centralized payment application
(425)

Centralized payment application compares and validates certificate of domain for URL with stored or pinned certificate for payment URL from centralized payment application
(430)

Match?
(435)

YES

NO

Centralized payment application presents payment page for customer to make payment to merchant
(440)

Centralized payment application shows error
(455)

Customer selects card from wallet or enters card details manually
(445)

Centralized payment application submits payment to merchant bank account
(450)

FIGURE 4

SYSTEMS AND METHODS OF VERIFYING ORIGIN OF REQUEST FOR PAYMENT

RELATED APPLICATIONS

This application is continuation of U.S. patent application Ser. No. 17/463,220, now U.S. Pat. No. 12,182,817, filed Aug. 31, 2021, the disclosure of which is hereby incorporated, by reference, in its entirety.

BACKGROUND OF THE INVENTION

1. Field of the Invention

Embodiments relate generally to systems and methods for verifying origin of request for payment.

2. Description of the Related Art

Customers may be presented with the opportunity to receive a message that allows them to make a payment to merchant. When the customer receives such message, the customer may make the payment from the customer's own device by navigating to the URL that accepts payments. The customer, however, does not know anything about the URL—it could be a valid URL, or it could be a link that causes payment to be made to a malicious party.

SUMMARY OF THE INVENTION

Systems and methods for verifying origin of request for payment are disclosed. In one embodiment, a method for verifying origin of request for payments may include: (1) receiving, by a financial institution computer program executed by a financial institution backend for a financial institution, a request for a payment URL from a merchant, the payment URL provided for a transaction with a customer using a customer electronic device; (2) generating, by the financial institution computer program, the payment URL, wherein the payment URL comprises a pointer to a network location for the financial institution; (3) providing, by the financial institution computer program, the payment URL to the customer electronic device; (4) receiving, by the financial institution computer program and from an application executed by the customer electronic device and at a browsed URL, a stored or pinned certificate of domain for the payment URL; (5) comparing, by the financial institution computer program, the stored or pinned certificate of domain for the payment URL to a certificate of domain for the browsed URL; (6) presenting, by the financial institution computer program, a payment page in response to the certificate of domain for the payment URL matching the stored or pinned certificate of domain for the payment URL; and (7) returning, by the financial institution computer program, an error in response to the certificate of domain for the payment URL not matching the stored or pinned certificate of domain for the payment URL.

In one embodiment, the payment URL may also include a session identifier or a global unique identifier.

In one embodiment, the application executed by the customer electronic device may include a computer program or a browser application.

In one embodiment, the payment URL may be communicated by short messaging service (SMS) or email.

In one embodiment, the method may also include: receiving, at the payment page, payment details from the customer electronic device; executing, by the financial institution computer program, the transaction using the payment details; and crediting, by the financial institution computer program, a merchant account for payment.

In one embodiment, the error may also include a fraud message.

According to another embodiment, a method for verifying origin of request for payment using a centralized payment application may include: (1) receiving, at a centralized payment application backend executed by a centralized payment backend, a certificate of domain for a payment URL from a plurality of financial institution backends, each financial institution backend associated with one or more merchant; (2) communicating, by the centralized payment application backend, the certificates of domain for the payment URLs to a centralized payment application executed by a customer electronic device, wherein the centralized payment application stores or pins the certificates of domain for the payment URLs; (3) receiving, from the centralized payment application and at a browsed URL, a certificate of domain for one of the payment URLs; (4) comparing, by the centralized payment application backend, the certificate of domain for the browsed URL to one of the stored or pinned certificates of domain for the payment URL; (5) presenting, by the centralized payment application backend, a payment page in response to the received certificate of domain matching the stored or pinned certificate of domain; and (6) returning, by the centralized payment application backend, an error in response to the received certificate of domain not matching the stored or pinned certificate of domain.

In one embodiment, the payment URL may also include a session identifier or a global unique identifier.

In one embodiment, the centralized payment application executed by the customer electronic device may include a centralized payment computer program or a browser application.

In one embodiment, the payment URL may be communicated by short messaging service (SMS) or email.

In one embodiment, the method may also include: receiving, at the payment page, payment details from the customer electronic device; executing, by the financial institution computer program, the transaction using the payment details; and crediting, by the financial institution computer program, a merchant account for payment.

In one embodiment, the error may also include a fraud message.

In one embodiment, the payment URL may be displayed at a payment terminal.

According to another embodiment, an electronic device may include: a memory storing a financial institution computer program; and a computer processor. When executed by the computer processor, the financial institution computer program may cause the computer processor to: receive a request for a payment URL from a merchant, the payment URL provided for a transaction with a customer using a customer electronic device; generate the payment URL, wherein the payment URL comprises a pointer to a network location for the financial institution; provide the payment URL to the customer electronic device; receive from an application executed by the customer electronic device and at a browsed URL, a stored or pinned certificate of domain for the payment URL; compare the stored or pinned certificate of domain for the payment URL to a certificate of domain for the browsed URL; present a payment page in response to the certificate of domain for the payment URL matching the stored or pinned certificate of domain for the payment URL; and return an error in response to the certificate of domain for the payment URL not matching the stored or pinned certificate of domain for the payment URL.

In one embodiment, the payment URL may also include a session identifier or a global unique identifier.

In one embodiment, the application executed by the customer electronic device may include a computer program or a browser application.

In one embodiment, the payment URL may be communicated by short messaging service (SMS) or email.

In one embodiment, the financial institution computer program may also cause the computer processor to: receive payment details from the customer electronic device; execute the transaction using the payment details; and credit a merchant account for payment.

In one embodiment, the error may also include a fraud message.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

FIG. 2 depicts a method for verifying origin of request for payment according to an embodiment;

FIG. 4 depicts a method for verifying origin of request for payment using a centralized payment application according to an embodiment;

DETAILED DESCRIPTION OF PREFERRED EMBODIMENTS

Embodiments relate generally to systems and methods for verifying origin of request for payment.

In embodiments, a trusted application provided by a financial institution or a centralized service may pin or embed the payment domain's X.509 certificate in the application. The trusted app may be deep linked to open a URL, so that when the user clicks the URL, the operating system (OS) on the customer's electronic device may recognize that clicked link is associated with a trusted installed application. The OS may launch the installed application to access the payment URL, and the trusted application may match the embedded certificate with the certificate detected in URL that was used to open the trusted application. If a match is successful, the trusted application may render a payment page where user may select or enter the card information to make the payment. If the match is unsuccessful, the trusted application may inform the user that the link is potentially fraudulent.

Figure 1:
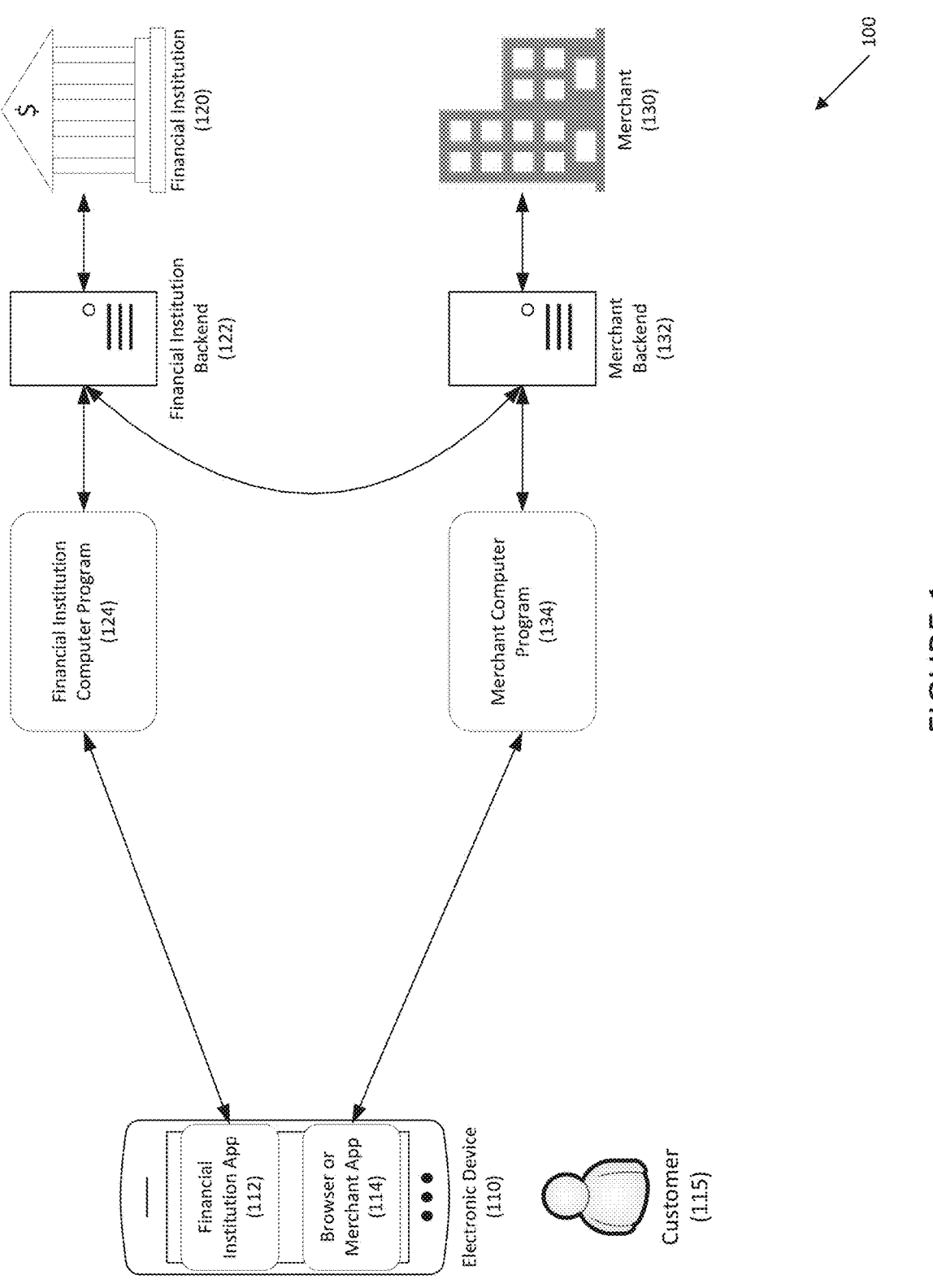
FIG. 1 is a depicts a system for verifying origin of request for payment according to an embodiment.

Referring to FIG. 1, a system for verifying origin of request for payment according to an embodiment. System 100 may include electronic device 110, which may be any suitable customer electronic device including computers (e.g., desktop, notebook, laptop, tablet, etc.), smartphones and smart devices, Internet of Things (IoT) devices, etc. Electronic device 110 may execute one or more computer applications or programs, such as financial institution application 112, browser or merchant application 114, etc.

Financial institution 120 may be a financial institution that is used by merchant 130 or holds one or more account for merchant 130. In one embodiment, financial institution 120 may provide financial institution backend 122 that may be any suitable electronic device (e.g., physical servers, cloud servers, combinations, etc.). Backend 122 may execute financial institution computer program 124 that may interface with financial institution application 112.

Merchant 130 may provide goods or services for customer 115. Merchant 130 may provide merchant backend 132 that may be any suitable electronic device (e.g., physical servers, cloud servers, combinations, etc.). Backend 132 may execute merchant computer program 134 that may interface with browser or merchant application 114.

Referring to FIG. 2, a method for verifying origin of request for payment according to an embodiment. In step 205, using a customer electronic device, such as a smartphone executing a merchant application or a browser application, a customer may make a purchase at merchant website.

In step 210, a computer program executed by a computer at the merchant may request that the merchant's financial institution generate a payment URL for the transaction with the customer.

In step 215, a computer program executed by a backend for the financial institution may generate a payment URL and may provide the payment URL to the customer electronic device. In one embodiment, the payment URL may include a pointer to a network location for the financial institution. In one embodiment, the computer program may further provide a reference to the transaction or a representation of the purchase. In one embodiment, in terms of data, the link may be generic to increase security, and the pointer may be based on a session identifier, a global unique identifier (GUID), etc.

In one embodiment, the payment URL may be sent by short messaging service (SMS), email, in-app notification, etc.

In step 220, the customer may open the payment URL, which may launch an application provided by the financial institution. In one embodiment, if the application is not present on the customer electronic device, the customer may be prompted to download the application.

The financial institution application may store or pin a certificate of domain for the payment URL that may be used to validate the payment URL, and the application may provide the stored or pinned certificate of domain for the payment URL to the computer program executed at the financial institution backend.

In step 225, the computer program executed at the financial institution backend may compare and validate the certificate of domain for the payment URL with the stored or pinned certificate for the payment URL from the financial institution application.

In step 230, if the certificate of domain for the browsed payment URL matches the stored or pinned certificate of domain for the payment URL, in step 235, the financial institution application may present a payment page for the customer to make a payment to merchant.

In step 240, the customer may select a payment mechanism from the customer's wallet (e.g., credit card, debit card, account, etc.) or may enter the card details manually. In step 245, the financial institution may receive the selection and may submit payment to a merchant bank account. For example, the financial institution may execute the transaction using the payment details and credit a merchant account for payment.

If there is a mismatch, which indicates that the link may be fraudulent, in step 250, the financial institution application may return an error and may present the error to the customer.

Figure 3:
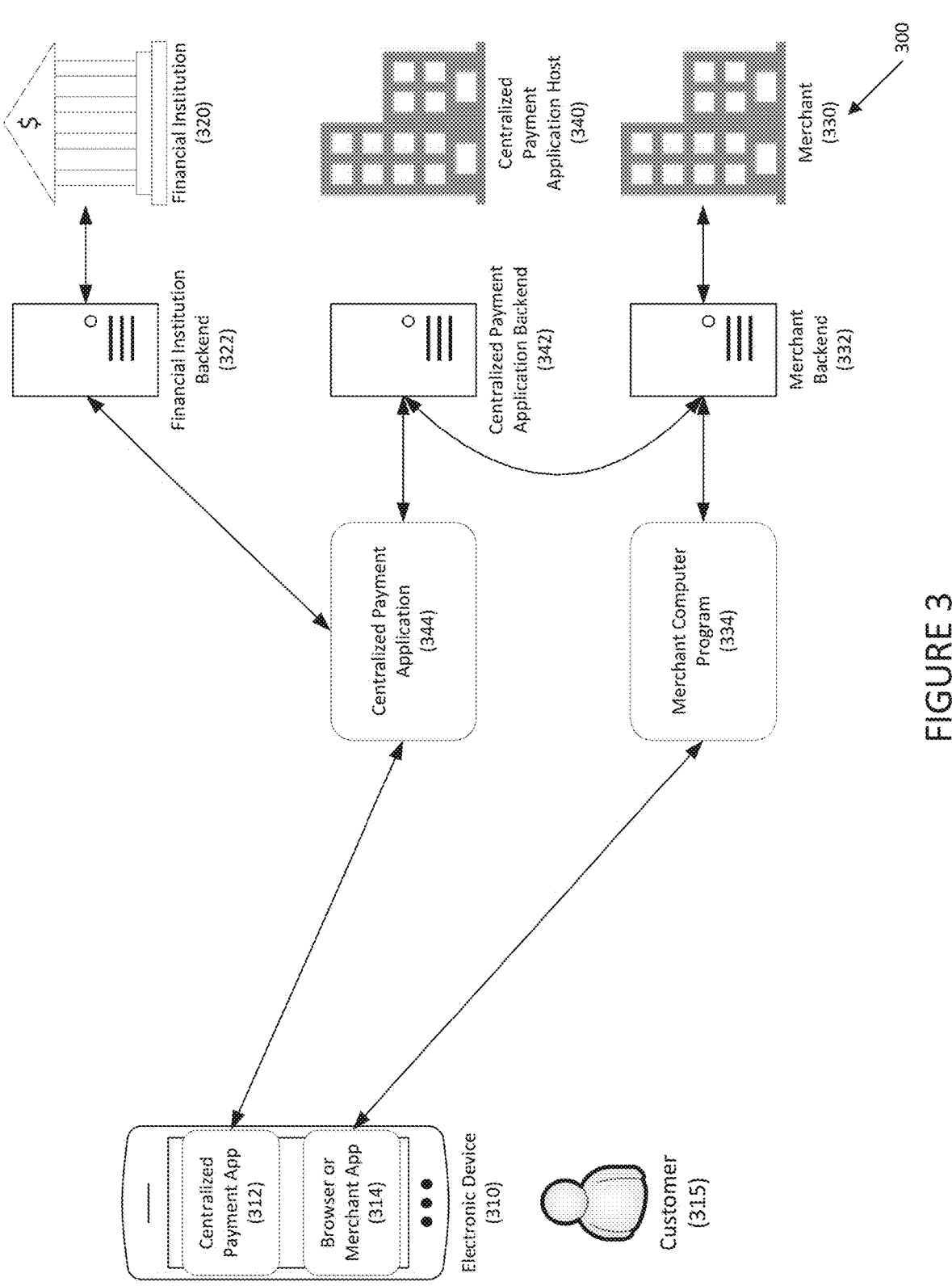
FIG. 3 depicts a system for verifying origin of request for payment using a centralized payment application according to an embodiment.

Referring to FIG. 3, a system for verifying origin of request for payment using a centralized payment application according to an embodiment. System 300 may include electronic device 310, which may be any suitable customer electronic device including computers (e.g., a desktop, notebook, laptop, tablet, etc.), smartphones and smart devices, Internet of Things (IoT) devices, etc. Electronic device 310 may execute one or more computer applications or programs, such as centralized payment application 312, browser or merchant application 314, etc.

Financial institution 320 may be a financial institution that is used by one or more merchant 330 or holds one or more account for merchants 330. In one embodiment, financial institution 320 may provide financial institution backend 322 that may be any suitable electronic device (e.g., physical servers, cloud servers, combinations, etc.).

In one embodiment, a plurality of financial institutions 320 may be provided as is necessary and/or desired.

Merchant 330 may provide goods or services for customer 315. Merchant 330 may provide merchant backend 132 that may be any suitable electronic device (e.g., physical servers, cloud servers, combinations, etc.). Backend 332 may execute merchant computer program 334 that may interface with browser or merchant application 314.

Although only one merchant 330 is depicted in FIG. 3, it should be recognized that a plurality of merchants 330 may be included. In addition, each merchant 330 may be associated with a financial institution 320. In embodiments, more than one merchant 330 may be associated with the same financial institution 320.

System 300 may further include centralized payment application host 340, which may be any suitable trusted entity, including financial institutions, FinTechs, third parties, etc. Centralized payment application host 340 may provide centralized payment application backend 342, which may be any suitable electronic device (e.g., physical servers, cloud servers, combinations, etc.). Centralized payment application backend 342 may interface with merchant backend 332.

Centralized payment application host 340 may execute centralized payment application 344 that may interface with browser or centralized payment application 312.

In one embodiment, centralized payment application host 340 may be one of financial institutions 320.

Referring to FIG. 4, a method for verifying origin of request for payment using a centralized payment application according to an embodiment In step 405, one or more merchant financial institution backends may provide certificates of domain for payment URLs to a centralized payment application backend. Each financial institution may have its own payment URL. The centralized payment application backend may communicate the certificates to a centralized payment application executed on a customer electronic device, which may store or pin the certificates in the centralized payment application.

In step 410, using a customer electronic device, such as a smartphone executing a merchant application or a browser application, a customer may make a purchase at merchant website.

In step 415, a computer program executed by a computer at the merchant may request that the merchant's financial institution generate a payment URL for the customer.

In step 420, a computer program executed by a backend for the financial institution may generate a payment URL and may provide the payment URL to the customer electronic device. In one embodiment, the payment URL may include a pointer to a network location for the financial institution, a session identifier, a GUID, etc.

In one embodiment, the payment URL may be sent by SMS, email, in-app notification, etc.

In step 425, the customer may open the payment URL, which may launch an application provided by the centralized payment application host. In one embodiment, if the centralized payment application is not present on the customer electronic device, the customer may be prompted to download the centralized payment application.

The centralized payment application may provide the stored or pinned certificate of domain for the payment URL to the computer program executed at the centralized payment application backend.

In step 430, the centralized payment application backend may compare and validate the certificate of domain with the pinned or stored certificate of domain from the centralized payment application.

In step 435, if there is a match, in step 440, the centralized payment application presents payment page for customer to make payment to merchant. In step 445, the customer may select a card or account from a wallet in the payment application or may enter the details manually. In step 450, the centralized payment application may submit payment to the merchant bank account.

If there is a mismatch, which indicates that the link may be fraudulent, in step 455, the centralized payment application may return an error and may present the error to the customer.

Figure 5:
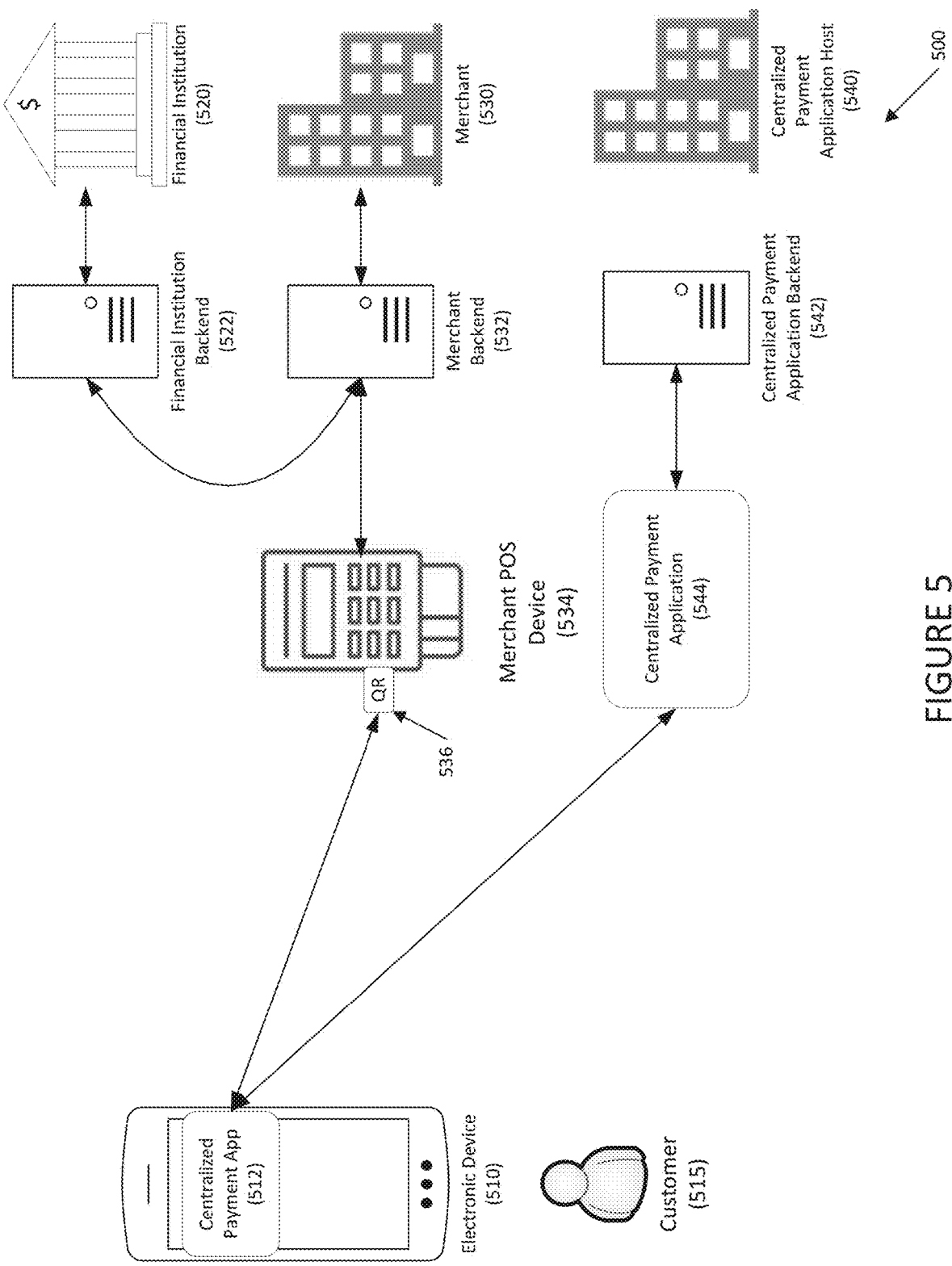
FIG. 5 depicts a system for verifying origin of request for payment using a centralized payment application according to another embodiment.

Referring to FIG. 5, a system for verifying origin of request for payment using a centralized payment application is disclosed according to another embodiment. System 500 may include electronic device 510, which may be any suitable customer electronic device including computers (e.g., desktop, notebook, laptop, tablet, etc.), smartphones and smart devices, Internet of Things (IoT) devices, etc. Electronic device 510 may execute one or more computer applications or programs, such as centralized payment application 512.

Financial institution 520 may be a financial institution that is used by one or more merchant 530 or holds one or more account for merchants 530. In one embodiment, financial institution 520 may provide financial institution backend 522 that may be any suitable electronic device (e.g., physical servers, cloud servers, combinations, etc.). A plurality of financial institutions 520 may be provided.

Merchant 530 may provide goods or services for customer 515. Merchant 530 may provide merchant backend 532 that may be any suitable electronic device (e.g., physical servers, cloud servers, combinations, etc.). Backend 532 may interface with financial institution backend 522.

Merchant 530 may provide point of sale device 534, which may be a stand-alone point of sale device, a point of sale application executed on a suitable electronic device, etc. Point of sale device 534 may receive and display machine readable code 536 that may be provided by financial institution backend 522. In one embodiment, machine readable code 536 may be a sticker that may be affixed to or near point of sale device 534; in another embodiment, machine readable code 536 may be displayed by a display on point of sale device 534.

Although only one merchant 530 is depicted in FIG. 5, it should be recognized that a plurality of merchants 530 may be included. In addition, each merchant 530 may be associated with a financial institution 520. In embodiments, more than one merchant 530 may be associated with the same financial institution 520.

Machine readable code 536 may include a URL that may point to the financial institution 520 associated with the merchant. In one embodiment, the URL may be generated by centralized payment application backend 542.

System 500 may further include centralized payment application host 540, which may be any suitable trusted entity, including financial institutions, FinTechs, third parties, etc. Centralized payment application host 540 may provide centralized payment application backend 542, which may be any suitable electronic device (e.g., physical servers, cloud servers, combinations, etc.). Centralized payment application backend 542 may interface with merchant backend 532.

Centralized payment application host 540 may execute centralized payment application 544 that may interface with a browser or centralized payment application 512.

In one embodiment, centralized payment application host 540 may be one of financial institutions 520.

Figure 6:
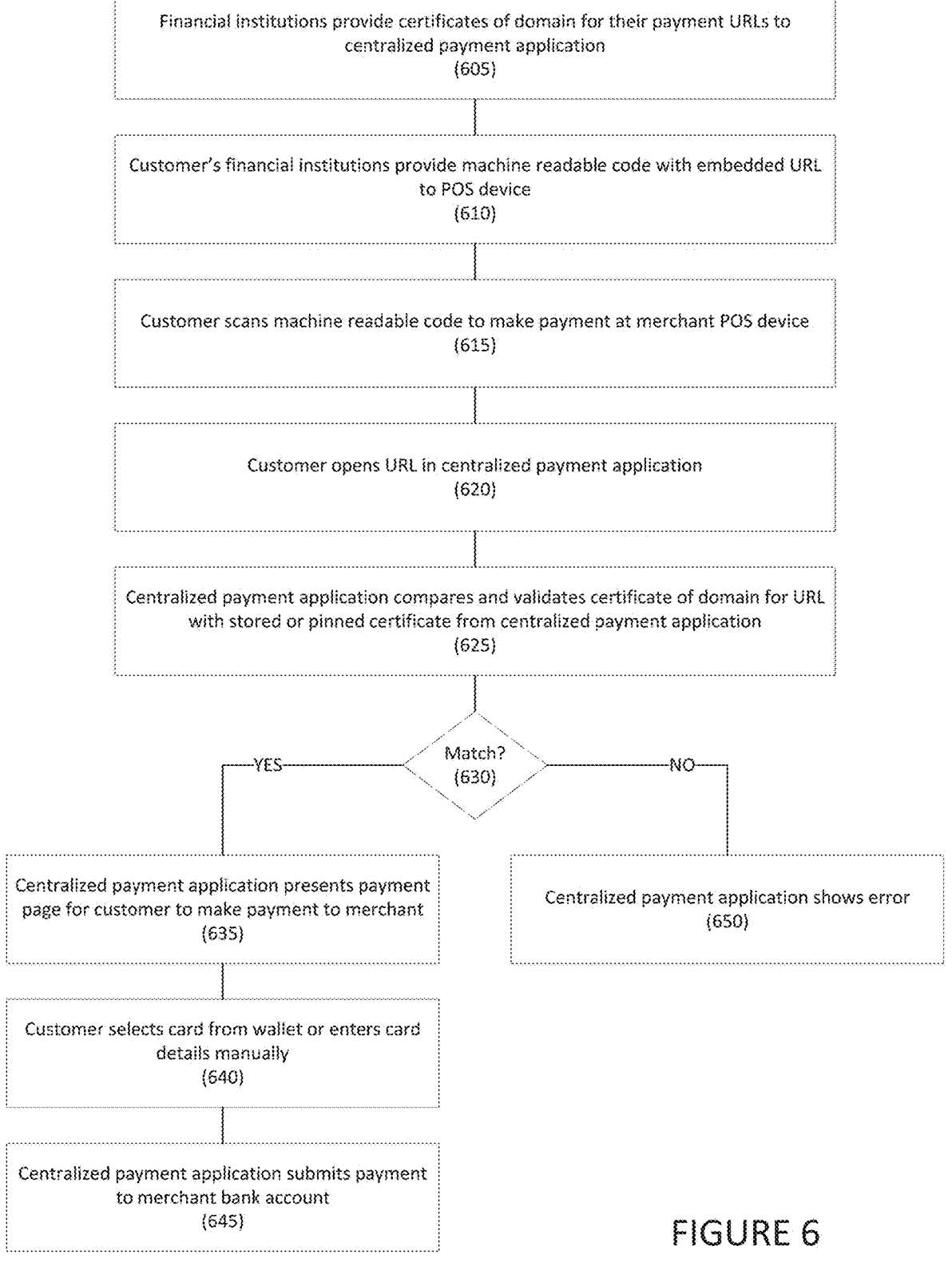
FIG. 6 depicts a method for verifying origin of request for payment using a centralized payment application according to another embodiment.

Referring to FIG. 6, a method for verifying origin of request for payment using a centralized payment application is disclosed according to another embodiment.

In step 605, one or more financial institutions may provide certificates of domain for payment URLs to a centralized payment application. In step 610, each financial institution may further provide a machine-readable code with an embedded URL to a POS device provided at the merchant. The machine-readable code may be provided as a sticker, as an image, etc.

In step 615, a customer may scan the machine-readable code to make payment at merchant POS device. In one embodiment, the customer may scan the machine-readable code with the centralized payment application, or may scan the code with an image capture application.

In step 620, the electronic device may launch the centralized payment application if not already launched, or may prompt the customer to download the centralized payment application. The centralized payment application may open the URL from the machine-readable code.

The centralized payment application may provide the stored or pinned certificate of domain for the payment URL to the computer program executed at the centralized payment application backend.

In step 625, the centralized payment application backend may compare and validate the certificate of domain of the URL with the stored or pinned certificate from the centralized payment application.

In step 630, if there is a match, in step 635, the centralized payment application may present a payment page for customer to make payment to merchant. In step 640, the customer may select a card or account from a wallet in the payment application or may enter the details manually. In step 645, the centralized payment application may submit payment to the merchant bank account.

If there is a mismatch, which indicates that the link may be fraudulent, in step 650, the centralized payment application may return an error and may present the error to the customer.

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:

maintaining, by a financial institution, a payment domain and a certificate of domain for a payment domain;

providing, by the financial institution, a trusted application, wherein the trusted application includes an embedded certificate of domain, and wherein the embedded certificate of domain corresponds to the certificate of domain for the payment domain;

generating, by a financial institution computer program executed by a financial institution backend of the financial institution, a machine-readable code comprising a payment uniform resource locator (URL) embedded therein, wherein:

the payment URL comprises a pointer to a network location for the financial institution;

the payment URL maps to the payment domain maintained by the financial institution; and the payment URL includes a deep-link association with the trusted application;

communicating, by the financial institution computer program, the machine-readable code to a merchant point of sale device for a merchant;

scanning, by a customer electronic device, the machine-readable code that is displayed by the merchant point of sale device;

executing, by the customer electronic device and in response to a user scanning the machine-readable code as part of a transaction, the trusted application via the deep-link association with the trusted application included in the payment URL;

receiving, by the financial institution computer program and at the payment uniform resource locator and from the trusted application, the embedded certificate of domain;

comparing, by the financial institution computer program, the embedded certificate of domain to the certificate of domain for the payment domain;

in response to the comparison, determining, by the financial institution computer program, a match between the embedded certificate of domain and the certificate of domain for the payment domain;

in response to the determination of the match, presenting, by the financial institution computer program to the customer electronic device, a payment web page;

receiving, by the financial institution computer program at the payment web page, payment details from the customer electronic device; and executing, by the financial institution computer program, the transaction using the payment details.

2. The method of claim 1, wherein the trusted application executed by the customer electronic device comprises a computer program or a browser application.

3. The method of claim 1, wherein the certificate of domain for the payment domain is an X.509 certificate.

4. The method of claim 1, wherein the customer electronic device is a smartphone.

5. The method of claim 1, wherein the customer electronic device is a laptop computer.

6. The method of claim 1, further comprising:

crediting, by the financial institution computer program, a merchant account for payment.

7. A system, comprising:

a financial institution backend for a financial institution, the financial institution backend executing a financial institution computer program;

a merchant point of sale device; and a customer electronic device;

wherein:

the financial institution maintains a payment domain and a certificate of domain for a payment domain;

the financial institution provides a trusted application, wherein the trusted application includes an embedded certificate of domain, and wherein the embedded certificate of domain corresponds to the certificate of domain for the payment domain;

the financial institution computer program generates a machine-readable code comprising a payment uniform resource locator (URL) embedded therein, wherein:

the payment URL comprises a pointer to a network location for the financial institution;

the payment URL maps to the payment domain maintained by the financial institution; and the payment URL includes a deep-link association with the trusted application;

the financial institution computer program communicates the machine-readable code to a merchant point of sale device for a merchant;

the customer electronic device scans the machine-readable code that is displayed by the merchant point of sale device;

the customer electronic device executes, in response to a user scanning the machine-readable code as part of a transaction, the trusted application via the deep-link association with the trusted application included in the payment URL;

the financial institution computer program receives, at the payment uniform resource locator and from the trusted application, the embedded certificate of domain;

the financial institution computer program compares the embedded certificate of domain to the certificate of domain for the payment domain;

in response to the comparison, the financial institution computer program determines a match between the embedded certificate of domain and the certificate of domain for the payment domain;

in response to the determination of the match, the financial institution computer program presents, to the customer electronic device, a payment web page;

the financial institution computer program receives, at the payment web page, payment details from the customer electronic device; and the financial institution computer program executes the transaction using the payment details.

8. The system of claim 7, wherein the trusted application executed by the customer electronic device comprises a computer program or a browser application.

9. The system of claim 7, wherein the financial institution computer program credits a merchant account for payment.

10. The system of claim 7, wherein the certificate of domain for the payment domain is an X.509 certificate.

11. The system of claim 7, wherein the customer electronic device is a smartphone.

12. The system of claim 7, wherein the customer electronic device is a laptop computer.

\* \* \* \* \*